June 6, 1967
N. J. KODA
3,324,329
INFRARED IMAGE CONVERTER AND DISPLAY TUBE
Filed July 22, 1965
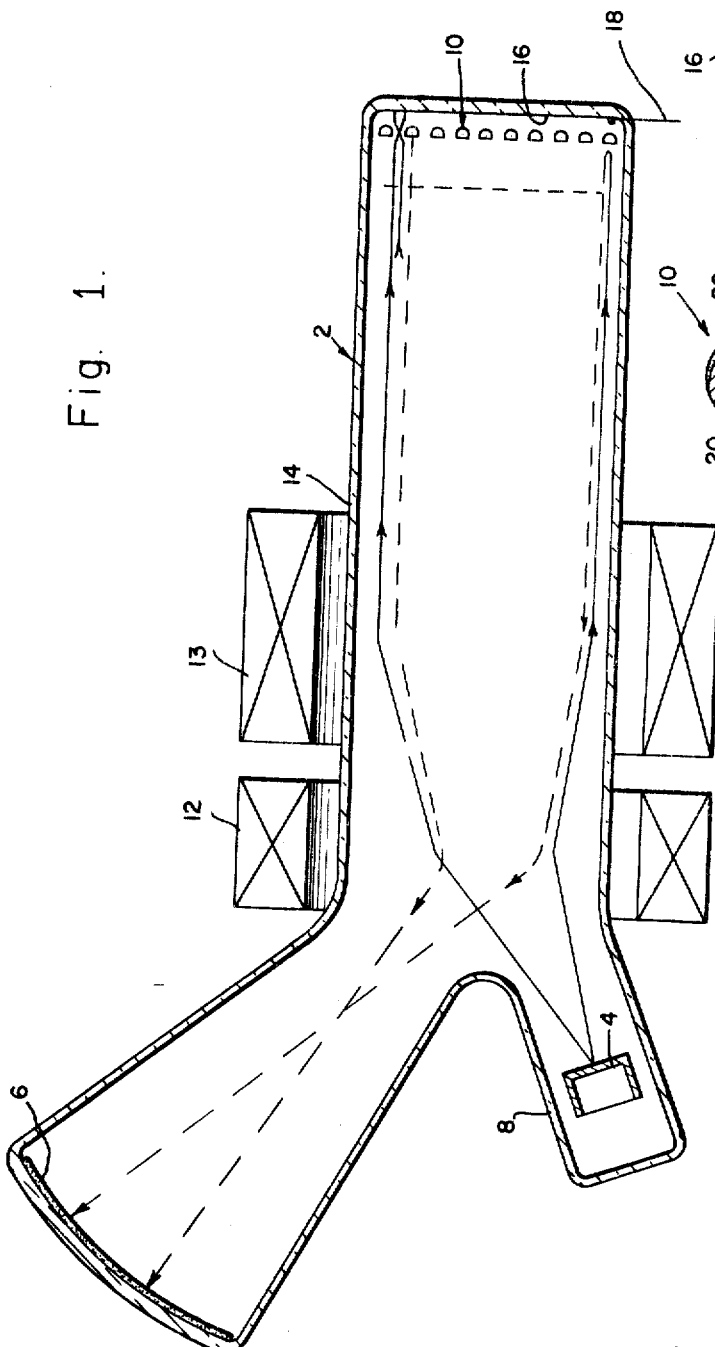
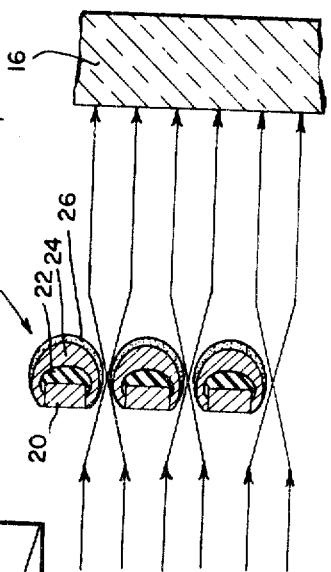
Nobuo J. Koda,
INVENTOR.
BY
ATTORNEY.

United States Patent Office 3,324,329
Patented June 6, 1967

3,324,329
INFRARED IMAGE CONVERTER AND DISPLAY TUBE
Nobuo J. Koda, Vista, Calif., assignor to Hughes Aircraft Company, Culver City, Calif., a corporation of Delaware
Filed July 22, 1965, Ser. No. 473,989
4 Claims. (Cl. 313—101)

The present invention relates to the direct conversion of far infrared energy scenes into optically viewable scenes or displays. More particularly, the invention relates to an infrared camera cathode ray tube in which infrared energy is converted by electron beam means into an optically viewable display.

The generation of viewable displays of thermal radiations is known and many devices are available for accomplishing such generation. Likewise, the generation of electrical signals from thermal radiations is known and an infrared camera tube for producing such electrical signals as described in my co-pending application, S.N. 450,333 filed Apr. 23, 1965, entitled, "Far Infrared Imaging Tube," and assigned to the instant assignee. While the present invention is intended to convert long wavelength infrared radiation (i.e., of about 10 microns wavelength) into a visible display, it is known that there are image converters that work in the visible range which are actually light intensifiers. Other converters related to the present invention operate in the X-ray region, for example, and convert X-ray images or information into visible displays. Very little, however, is known about the direct conversion of long wavelength infrared information into visual displays.

It is therefore an object of the present invention to provide an improved infrared imaging or pickup tube which directly converts infrared information into visual display.

Another object of the invention is to provide an infrared imaging tube of improved sensitivity.

Still another object of the invention is to provide improved apparatus for converting thermal radiations into visual displays.

These and other objects and advantages of the invention are realized by providing an infrared responsive target in a cathode ray tube which target has a low electrical capacitance thus resulting in an enhanced sensitivity to infrared energy and which also is capable of modulating relatively large electron beam currents which are not limited by elemental target capacitance charging. The enhanced IR sensitive target of the invention is also relatively easy to construct. Enhanced sensitivity is obtained by utilizing a broad beam of electrons to flood the modulating target surface whose surface potential controls the penetration of electrons therethrough. The flood electron beam charges the dielectric target surface to zero or cathode potential so that with a positive voltage on the target mesh, most of the flood beam current is cut off and cannot proceed to a special electrode, provide adjacent the IR responsive target. Upon absorption of IR radiation, the "dark" current through the dielectric increases and the surface potential integrates to a more positive potential thus allowing flood electrons to penetrate therethrough to the aforementioned special electrode whose negative potential repels the flood electrons arriving thereat and causes them to turn around and proceed back toward the IR target for erasure and whose high positive potential prevents erasure and causes storage. The dielectric surface potential thus acts as a grid to modulate the electron beam to the phosphor viewing screen.

The invention will be described in greater detail by reference to the drawings in which:

FIGURE 1 is an elevational view, partially schematic and partly sectional, of the infrared converter tube of the invention; and FIGURE 2 is an elevational view in section of a detailed portion of the IR target and repeller electrode members of the tube shown in FIGURE 1.

Referring now to the drawings and FIGURE 1 in particular, a cathode ray tube is shown comprising an evacuated glass envelope or container 2 in one end of which is disposed a flood electron gun 4 for forming a broad beam of electrons. Since the viewing target or screen assembly 6 is likewise disposed in the same end of the envelope 2, the flood gun 4 is provided in a neck portion 8 of the envelope 2. This results in an off-axis displacement of the flood electron beam with respect to the target asesmbly 10 in the other end of the tube. Hence a deflection yoke member 12 is disposed around the outside of the main envelope portion 14 of the envelope 2 so as to permit the flood electron beam to be bent and caused to approach the IR target member 10 at substantially right angles thereto. Likewise disposed around the outside of the main envelope portion 14 is a collimating lens 13 for collimating electrons returning from the IR target end of the tube 2 as will be described in greater detail hereinafter. The tube of the present invention is specifically directed to providing a visual display of radiations impinging on the target member 10 which radiations are in the infrared frequency spectrum and particularly to infrared radiations in the wavelength region of 10 microns since this region represents infrared "window" in the atmosphere.

To permit such infrared radiations to impinge upon the target member 10, whose structure will be described in greater detail hereinafter, the faceplate end of the envelope 2 is provided with an infrared transmissive window 16 which also serves as an electrode member in a manner to be described more fully. I have found that a suitable window for this purpose may be formed of germanium. The IR transmissive window and electrode member 16 may be fused or otherwise hermetically sealed to the end of the envelope 2 which may itself be glass. An electrical lead 18 is ohmically connected to the window-electrode member 16 and brought outside the envelope 2 in any convenient and well-known manner so as to permit the establishment of a predetermined electrical potential thereon.

With particular reference to FIGURE 2, the IR sensitive target member 10 comprises an electrically conductive mesh support member 20 of nickel, for example, which may be electroformed. The support mesh member 20 in FIGURE 2 may be fabricated to have from 300 to 500 or more meshes per inch. Thermal insulator material of about 10 microns in thickness, for example, is deposited in the form of a layer 22 on the side of the nickel mesh 20 facing the IR transparent window 16. A suitable material for this purpose may be antimony sulfide, for example. A layer 24 of material capable of absorbing infrared energy is next disposed over the heat-insulating layer 22. Since it will be understood that the absorption of infrared energy results in a temperature rise in the absorber, the purpose of the heat-insulating layer 22 is to inhibit or reduce the action of the mesh support member 20 from acting as a heat sink for the heat generated in the absorber layer 24. A typically satisfactory IR absorber material may be a barely opaque layer of deposited gold, for example.

Deposited over the IR absorber layer 24 is a layer 26 of temperature sensitive dielectric material, about one-quarter to one mil thick, for example. A suitable dielectric material for this purpose may be arsenic triselenide deposited as a low density layer to achieve low capacitance. The completed target should have a transconductance, $g_m$, of about one micromho in order to provide high sensitivity.

The IR target assembly 10 is disposed in the envelope 2 so that the surface of the nickel mesh screen 20 faces the flood electron gun 4 and the surface of the IR sensitive layer 26 faces the IR transparent electrode member 16.

In operation, the dielectric layer 26 is flooded with electrons from the flood electron gun 4 until the potential of the dielectric surface is charged to zero or to the potential of the flood gun cathode. A potential which may be from about five to fifty volts positive with respect to the cathode of the electron gun 4 is maintained on the conductive support mesh 20. Under these conditions, most of the electron beam from the electron gun 4 is cut off from penetrating through the target member 10 and reaching the window electrode member 16. These electrons will impinge on the target mesh 20 releasing secondary electrons which are accelerated back towards the gun 4.

When the tube 2 is aimed at or exposed to IR radiation, the IR energy penetrates through the IR transparent signal collector "window" 16 and is absorbed in the absorber layer 24. At the areas of the absorber layer 24 where the IR radiation is absorbed, heat is generated which affects corresponding areas of the temperature sensitive layer 26 so that the current therethrough increases and the potential of corresponding surface areas integrates to a more positive voltage, thus permitting the flood electron beam to penetrate through the target 10 and approach the window electrode member 16. The dielectric surface potential thus acts as a grid to modulate the electron beam to the electrode member 16 in accordance with the intensity of the IR radiation received. Output signals are derived representative of the infrared radiation pattern received because secondary electrons from the target mesh 20 are returned from areas where there is no infrared radiation, while the primary electrons pass through the target 10 where there is infrared radiation. A portion of the flood electrons which penetrate through the infrared target 10 are turned back to the target dielectric surface 26 and part of the flood beam electrons impinge on the electrode member 16. The potential of the electrode member 16 controls the proportion of flood electrons which land on the dielectric surface 26, thus controlling the storage time of the information. That is, if all of the electrons which penetrate the target 10 land on the electrode member 16, there will be no erasure of charge on a dielectric surface of the infrared target 26. The secondary electrons released from the target mesh 20 (in regions of no infrared radiation) are accelerated back towards the flood gun 4. The collimating lens 13 collimates and images these returned electrons onto the phosphor viewing screen assembly 6. By means of a high accelerated potential maintained on the viewing target 6, the electrons are accelerated to a high velocity and strike the viewing target 6 so as to cause the areas impinged thereby to luminesce. In this way, a visual display of the radiation pattern is obtained.

By the target construction of the present invention, sensitivity is improved because the dielectric surface potential thus acts as a grid to modulate the beam transmitted to the electrode member 16. The construction of the target is such that with positive voltage on the target mesh 20, and with the dielectric surface 26 at zero potential, most of the beam is cut off from the electrode member 16. When the IR radiation is absorbed by the absorber layer 24, the dark current through the dielectric layer 26 increases and the surface potential integrates to a more positive voltage by choice of potential on electrode member 16. The advantage of this type of modulation over simple capacitance charging is that a small target capacitance and consequent higher voltage modulation are used to modulate the beam by grid action with a consequent increase in sensitivity.

There thus has been described a novel target construction for infrared imaging tubes in which the detection capability is increased by an order of magnitude. By the invention, an increase in the $g_m$ of the target is utilized so that, unlike the elemental capacitance discharge method, the novel target construction of the invention utilizes target modulation to control the amount of transmitted beam current through an aperture. With a target having a $g_m$ of one micromho, it has been calculated that the minimum object temperature difference which may be detected is considerably better than the theoretical sensitivity of prior art targets.

What is claimed is:
1. An infrared sensitive tube for converting infrared radiations into a visual display comprising:
   (A) an evacuated envelope having an electrically conductive infrared transparent window disposed in a first portion of said envelope;
   (B) an electron gun disposed in a second portion of said envelope for generating a flood beam of electrons;
   (C) a target electrode disposed in said first portion of said envelope and spaced from said window for modulating said flood electrons in accordance with infrared radiations impinging on said target electrode, said target electrode comprising:
      (1) an electrically conductive mesh support member;
      (2) a layer of thermally insulating material disposed on the side of the meshes of said mesh support member facing said window;
      (3) a layer of infrared absorber material disposed on said layer of thermally insulating material;
      (4) and a layer of temperature-sensitive dielectric material disposed on said layer of infrared absorber material;
   (D) and a viewing screen disposed in said first portion of said envelope and adapted to luminesce in response to the impingement thereon by flood electrons in accordance with the modulation thereof by said target electrode.

2. The invention according to claim 1 wherein said window is formed of germanium.

3. The invention according to claim 1 wherein said mesh support member is nickel, said layer of thermally insulating material is antimony sulfide, said layer of infrared absorber material is gold, and said layer of temperature-sensitive dielectric material is arsenic triselenide.

4. An infrared sensitive tube for converting infrared radiations into a visual display comprising:
   (A) an evacuated envelope having a predetermined axis and an electrically conductive infrared transparent window disposed in a first portion of said envelope;
   (B) an electron gun disposed in a second portion of said envelope and at an angle with respect to said axis for generating a flood beam of electrons;
   (C) and a target electrode disposed in said first portion of said envelope and spaced from said window for modulating said flood electrons in accordance with infrared radiations impinging on said target electrode, said target electrode comprising:
      (1) an electrically conductive mesh support member;
      (2) a layer of thermally insulating material deposited on the side of the meshes of said mesh support member facing said window;
      (3) a layer of infrared absorber material deposited on said layer of thermally insulating material;
      (4) and a layer of temperature sensitive material deposited on said layer of absorber material.
   (D) a viewing screen disposed in said first portion of said envelope and at an angle with respect to said axis for luminescing in response to the impingement thereon by flood electrons in accordance with the modulation thereof by said target electrode;

(E) means for bending and collimating said flood electrons parallel to said axis and onto said target electrode;

(F) and means for bending and collimating said modulated flood electrons off said axis and onto said viewing screen.

No references cited.

JAMES W. LAWRENCE, *Primary Examiner.*

ROBERT SEGAL, *Examiner.*